C. HANSGEN.
REGISTER.
APPLICATION FILED FEB. 3, 1915.
1,144,412.
Patented June 29, 1915.
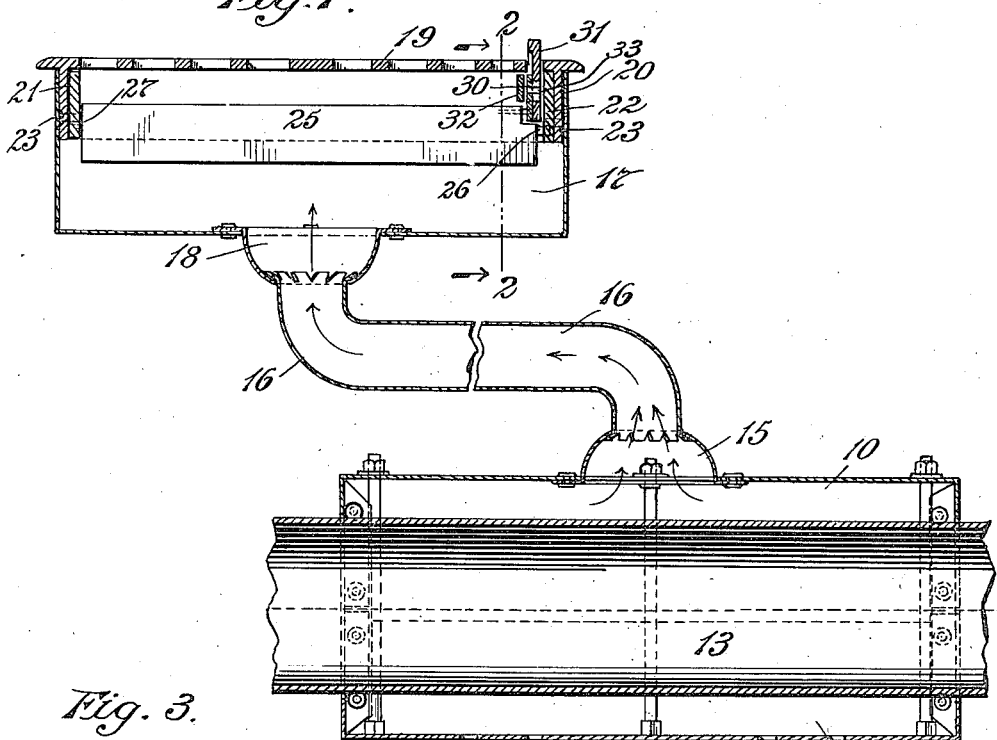
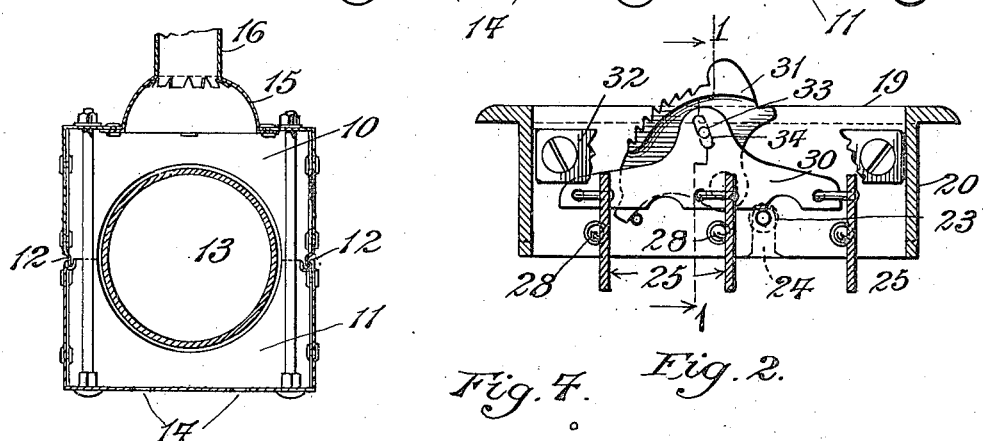
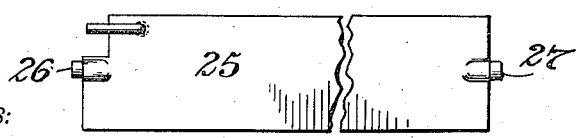
WITNESSES:
INVENTOR
Charles Hansgen
BY
ATTORNEYS

UNITED STATES PATENT OFFICE.

CHARLES HANSGEN, OF NEW YORK, N. Y.

REGISTER.

1,144,412.  Specification of Letters Patent.  Patented June 29, 1915.

Application filed February 3, 1915. Serial No. 5,842.

*To all whom it may concern:*

Be it known that I, CHARLES HANSGEN, a citizen of the United States, residing at New York, in the county of New York and State of New York, have invented certain new and useful Improvements in Registers; and I do hereby declare the following to be a full, clear, and exact description of the invention, such as will enable others skilled in the art to which it appertains to make and use the same.

The present invention refers to improved means for controlling hot or cold air in ventilation, and more particularly to a device adapted to use in automobiles, etc.

The invention is illustrated in a preferred form in connection with an automobile heating system in the accompanying drawing wherein, Figure 1 is a sectional view of the entire device, the upper part being shown in section on the line 1—1 of Fig. 2, Fig. 2 is a section of the controlling valve or damper on the line 2—2 of Fig. 1, Fig. 3 is a midsectional view of the exhaust pipe and hot air box and Fig. 4 is a plan view of one of the shutters or damper plates.

In carrying out my invention I form an inclosure or hot air box around a portion of the exhaust pipe from the automobile engine which becomes heated during the running of the same, and for this purpose I prefer to apply the box in two separable portions 10 and 11 fitting together in any suitable manner along the sides, as at 12, and against opposite sides of the exhaust pipe 13. The inclosed chamber thus formed is supplied with suitable openings 14 for admission of air, and at the top thereof is preferably placed a dome 15, from which a pipe 16 leads to the feet of the chauffeur or to another suitable point of distribution. At this point of distribution I prefer to supply a sheet metal chamber 17 having a dome 18 into which the pipe 16 leads, and the top of which is closed by the damper or valve. In its preferred form this damper takes the form clearly shown in Figs. 2 and 4. The upper surface of the damper is covered by a horizontal grating 19 from around the four sides of which depends a continuous web or flange 20 fitting into the top of the casing 17. This is intended to be placed in the floor of the car, where the feet of an occupant may rest upon it.

The damper proper constitutes an easily removable member so constructed as to be readily taken apart or assembled. It comprises for this purpose two end plates 21 and 22, normally supported against the end flanges 20 by screws 23 which can be slipped upward into slots 24 when the damper is put into place. It is thus unnecessary to do more than loosen or tighten these screws in removing and replacing the damper.

The valve plates 25, preferably three in number, are supported upon pivots 26 and 27, entering appropriate bearings 28 in the supporting end plates. At one end of each plate 25 is also fixed a shifting pin 29 which is bent as shown in Figs. 2 and 4, and the end of which enters a suitable aperture in the common shifting plate 30. This plate lies flat against the face of the operating sector 31, which latter is pivotally secured to the inner face of the supporting plate 22. Both parts 30 and 31 are confined between the plate 23 and the strip 32, preferably screwed to the plate 22, as shown in Fig. 2. A small pin 33 on the plate 30 enters a slot 34 in the sector 31, so that, as the latter is rocked one way or the other by the foot (or otherwise) the plate 30 is pushed one way or the other across its confining space. This movement of the plate 30, tilts all of the valve plates 25 simultaneously to open or close the damper.

By simply loosening the screws 23, the damper may be removed from the grating, when all its members will fall apart except the sector 31, which remains fastened by its pivot.

Various changes may be made in this device without departing from my invention, and I do not limit myself to the details herein shown and described.

What I claim is—

A grating having depending flanges in combination with a damper proper, comprising separate end plates removably secured to said flanges, an auxiliary strip secured parallel to one of said end plates, separate valve plates pivotally connected at their ends with said end plates, a shifting plate between said auxiliary strip and the corresponding end plate and pivotally secured to said valve plates, and an operating sector pivoted to one of said end plates and having a pin and slot connection with said shifting plate, substantially as described.

In testimony whereof, I affix my signature, in presence of two witnesses.

CHARLES HANSGEN.

Witnesses:
KATHARINE C. MEAD,
H. S. MACKAYE.